Figure 1:
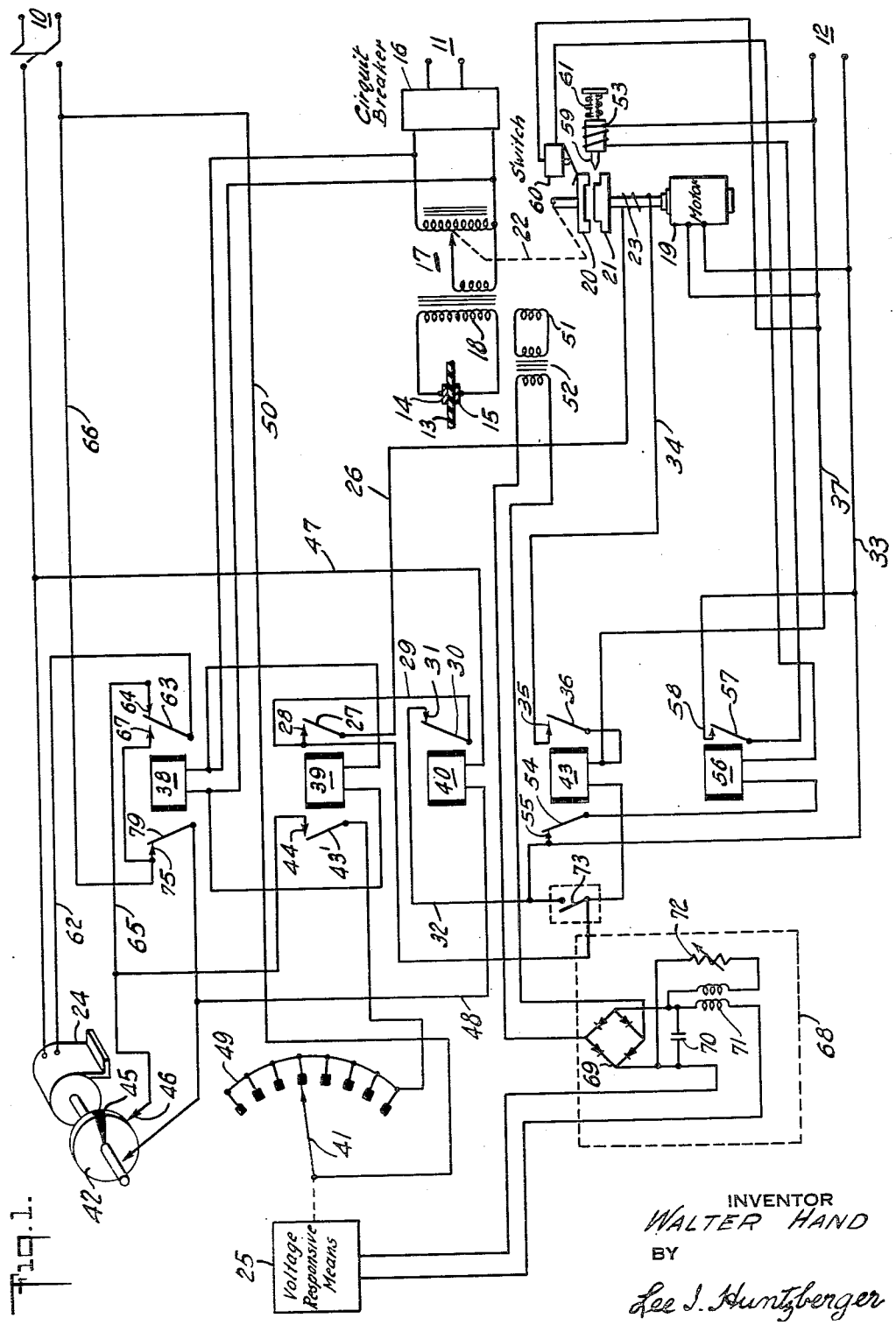

INVENTOR
WALTER HAND
BY
Lee J. Huntzberger

United States Patent Office 2,809,735
Patented Oct. 15, 1957

2,809,735

CLUTCH ARRANGEMENT FOR TEST EQUIPMENT

Walter Hand, Cambria Heights, N. Y.

Original application April 2, 1952, Serial No. 280,155, now Patent No. 2,724,087, dated November 15, 1955. Divided and this application September 27, 1955, Serial No. 537,072

3 Claims. (Cl. 192—84)

(Granted under Title 35, U. S. Code (1952), sec. 266)

The invention described herein may be manufactured and used by or for the Government of the United States of America for governmental purposes without the payment of any royalties thereon or therefor.

This invention relates to an automatic testing apparatus for ascertaining physical properties of specimens. For illustrative purposes, the invention is described with reference to an apparatus for testing the dielectric strength of specimens of insulation material according to a predetermined schedule.

This application is a division of patent application Serial No. 280,155, filed April 2, 1952, for Testing Apparatus, by Walter Hand, which has matured into Patent 2,724,087, issued November 15, 1955.

Previous to this invention, it was customary to conduct tests on dielectric specimens by manually controlling and recording all the steps and results. Examples of the two kinds of tests generally conducted are the short-time test and the step-by-step test. In the short-time test, a specimen of an insulating material is inserted between two electrodes and then starting at zero, the testing voltage is increased uniformly to breakdown at a rate of 500 volts per second or a lesser rate if breakdown occurs too soon. In the step-by-step test, an initial voltage is applied equal to 40 percent of the breakdown voltage in the short-time test. The voltage is then increased in increments as indicated in the schedule below, up to failure, and is held at each step for one minute. The change from one step to the next higher is made within 10 seconds.

| Breakdown by short-time test, Kilovolts | Increment of increase for step-by-step, Kilovolts |
|---|---|
| 12.5 or less | 0.5 |
| 12.5–25 | 1.0 |
| 25–50 | 2.5 |

In order to perform these tests manually, at least two men are needed. When the specimen is in position, one man reads the meter while another varies the test voltage. After a short time, the men become fatigued rendering the results very inaccurate. Furthermore, the man varying the voltage cannot do so at a constant uniform rate as required by the schedule. Hence it is evident that this manual method is unsatisfactory.

An object of this invention is to provide a clutch arrangement for test equipment.

A further object is to provide a device for producing quick disengagement of a pair of axially aligned cylindrical members having mating surfaces where one of the members is axially movable with respect to the other member.

A further object of this invention is the provision of a positive quick-acting means for quickly disengaging a pair of clutch elements from one another.

A further object is to provide a quickly disengageable clutch.

Figure 2:
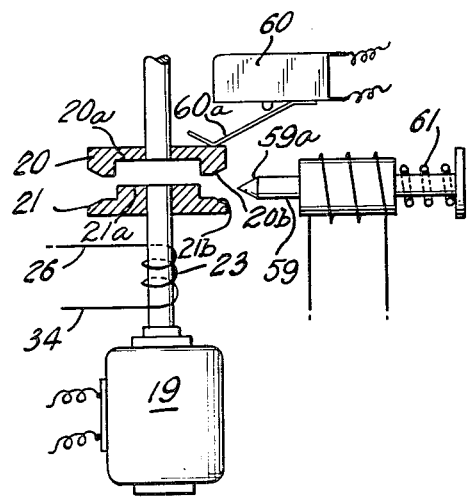

Other objects and many attendant advantages of this invention will be readily appreciated as the same becomes better understood by reference to the following detailed description when considered in connection with the accompanying drawing wherein:

Fig. 1 discloses a wiring diagram of an apparatus for testing dielectric specimens; and Fig. 2 shows on an enlarged scale the motor, clutch, and clutch disengaging means, included in the lower right hand corner of Fig. 1.

On the right side of the figure is shown a dielectric specimen 13, located between a pair of electrodes 14 and 15 which are connected to a variable voltage source. The electrodes may be located in any suitable environment such as an oil bath, depending upon the range of voltage to be applied to the dielectric specimen. The variable voltage source comprises a power supply 11 of preferably 110 or 220 volts 60 cycle A. C. Connected to the power supply 11 is an over-current circuit breaker 16. A variable autotransformer 17 is connected to the circuit breaker. The voltage picked off the autotransformer is stepped up by a fixed ratio transformer 18 and applied to the specimen. Upon rupture or sufficient partial breakdown of the specimen, the current drawn will be of sufficient magnitude to cause the circuit breaker to open thereby disconnecting the power supply 11 from the specimen. Any suitable autotransformer may be used and it can have either a rotatable or reciprocable operating member for varying its output voltage.

A constant speed motor 19 connected directly to a D. C. power source 12 is arranged for mechanically driving the operating member 22 of the autotransformer 17. The motor 19 is coupled to the autotransformer operating member 22 by means of a clutch having clutch plates 20, 21. The clutch plates have opposed mating surfaces 20a and 21a terminating in beveled edges 20b and 21b respectively. If desired, a transmission gear box, not shown, may be added between the motor and clutch for the purpose of providing a multi-speed drive to the operating member 22 of the autotransformer 17 whereby different rates of voltage rise may be applied to the specimen. Whenever the clutch 20, 21 couples the motor 19 to the operating member 22 of the autotransformer 17, the latter is moved at a constant rate until the clutch members 20, 21 are again disengaged.

The clutch members 20, 21 herein shown are engaged magnetically. This is done either by arranging one of the clutch plates 20 to function as the armature of an electromagnet or by connecting the other clutch plate 21 to a suitable movable magnetic core of the coil 23. In either case, when the coil 23 is energized, the clutch plates engage. Therefore, automatically controlling the energization and deenergization of coil 23 will automatically control the amount of voltage rise supplied to the dielectric specimen.

Broadly, three devices are arranged to control the condition of coil 23, namely, a timing means 24, a voltage responsive means 25, and the aforementioned circuit breaker 16.

The coil 23 is adapted to be energized by D. C. power supply 12 by means of a lead 26 connected to a contactor 27 which cooperates with a stationary contact 28 in circuit with lead 29 which connects with contactor 30 and its cooperating contact 31 which connects with lines 32, 33 to one side of D. C. supply 12. The other side of the coil is connected to contact 35 by means of lead 34, the contact cooperating with contactor 36 which is connected to the other side of the D. C. supply by means of lead 37. Hence there are three possible discontinuities arranged in the energization circuit of coil 23, each of the discontinuities occurring when each of the respective contactors 27, 30, and 36 move to open circuit position.

The position of contactor 27 is dependent upon the condition of circuit breaker 16. When the circuit breaker 16 is closed, relays 38 and 39 are energized, the coils of each relay being connected in parallel with one another across the circuit breaker 16. This portion of the description will be limited to relay 39. Relay 39 is instantly deenergized when the circuit breaker opens permitting contactor 27 to move away from contact 28 to immediately break the circuit continuity to coil 23. Therefore upon failure of the specimen 13, heavy current flow causes the circuit breaker to open deenergizing relay 39 which opens the circuit to coil 23 as set forth above. The autotransformer operating member 22 is thereby uncoupled from the drive motor 19.

The position of contactor 30 is dependent upon the condition of relay 40. Contactor 30 engages its mating contact 31 when relay 40 is deenergized. The energization of relay 40 is controlled by three elements, each of which must be in circuit closing position. The three elements are the pointer 41, the timing disc 42 and the contactor 43'. Contactor 43' remains engaged with contact 44 for so long as the circuit breaker 16 is closed. The operation of the voltage responsive instrument 25 and the timing device 24, 42 will be subsequently described. However, it will be noted that relay 40 will be energized and deenergized cyclically in accordance with the schedule set by the timing device 24, 42 and the voltage responsive instrument 25. Contactor 30 is thereby moved to open and closed position according to a predetermined cyclic schedule.

The third contactor 36 in the circuit of coil 23 follows the position of contactor 30, being in open position when 30 is in open position and being in closed position when 30 is in closed position. In step-by-step operation, contactor 36 duplicates the action of contactor 30. The reason for this is that relay 43 is energized and deenergized in accordance with the position of contactor 30 during step-by-step operation. The utility of contactor 36 will be more clearly understood when the short-run operation is described.

Since contactor 27 remains in closed position till breakdown of the specimen, contactor 36 is opened and closed in accordance with the open and closed position of contactor 30. Therefore, the controls for relay 40 determine the cyclic energization and deenergization of coil 23. The timing disc 42 opens the circuit to relay 40 once every revolution by means of an insulating insert 45 which comes under the cooperating brush 46. The disc shown could equally well be a cam cooperating with the button of a snap switch.

The relay 40 is arranged to be energized by supply 10 being connected to one side of supply 10 by means of a lead 47. It is connected to the other side of supply 10 by means of a lead 48 conductively engaging the shaft carrying disc 42. The disc 42, electrically connected to its shaft, is in conductive relationship with the brush 46 for most of a rotation. Brush 46 is connected to contact 44; contactor 43' which is adapted to engage contact 44 is in series with contacts 49 which cooperate with pointer 41. The pointer 41 is connected to the other side of supply 10 through lead 50.

When the circuit to relay 40 is broken by the timing disc, a cycle is initiated. The relay 40 is deenergized permitting contactor 30 to move to closed position. Contactor 36 follows as previously described. The circuit to coil 23 is thereby energized. The clutch members 20, 21 engage under electromagnetic action. The autotransformer 17, coupled to the motor 19, increases the voltage across the specimen 13 at a uniform rate. The voltage across the specimen is monitored by an auxiliary coil 51 through transformer 52 to instrument 25. The instrument pointer 41 thereby follows the voltage variations across the specimen 13.

As the voltage across a specimen rises, the pointer 41 moves off one of the series of contacts 49 and moves toward the next one. The contacts are arranged according to predetermined voltage increments. As the timing disc 42 rotates into conductive relationship with the brush 46, the pointer 41 approaches and then engages the next contact 49. With both the disc 42 and pointer 41 in circuit closing position, relay 40 is again energized, moving contactor 30 to open circuit position. The clutch coil 23 is deenergized whereby the motor 19 is uncoupled from the autotransformer 17 and the voltage rise across the specimen 13 is halted. It is important for proper operation that the timing disc proceed into circuit closing position before the pointer 41 engages the next contact step. If the device is not so designed, the voltage across the specimen may rise two steps at a time since the voltage across the specimen continues to rise so long as the disc 42 remains in open circuit position. Instrument 25 may be any ordinary type voltmeter with or without a recorder, the contacts 49 being added adjacent the instrument scale.

Auxiliary heavy duty solenoid means 53 is provided to positively and quickly separate the clutch members as the next voltage step is applied to the specimen 13. For this purpose, each of the clutch members is provided with a beveled edge at their mating surfaces. When relay 40 is energized upon reaching a desired voltage step, contactor 30 is moved to open position, deenergizing relay 43. As soon as relay 43 is deenergized, contactor 54 engages contact 55. The circuit through relay 56 is then closed through the D. C. supply through contactor 54 and contact 55 which is connected to the D. C. supply through lead 33. Switch 60 which is in the energization circuit of relay 56 is normally closed. When relay 56 is energized, contactor 57 is moved into engagement with contact 58 thereby putting solenoid coil 53 across the supply 12. The core 59 of solenoid 53 has a conical end 59a which is adapted to assume either an extended or retracted position. When in extended position the conical end 59a enters between the beveled edges 20b and 21b of the clutch plates wedging plates 20 and 21 apart. Plate 20 upon moving to disengaged position engages switch actuator 60a and opens switch 60 thereby deenergizing relay 56 which in turn deenergizes coil 53. A spring 61 returns the core 59 to retracted position. To avoid eccentric loading two or more equally spaced solenoids may be used.

Relay 38 controls the timing motor circuit. Relay 38 is deenergized when circuit breaker 16 is open. When the relay is deenergized, the circuit to the timing motor is completed from one side of the supply 10 to the motor 24 through lead 62 and from there to contactor 63 and contact 64 which is connected to lead 65 and brush 46. Disc 42 is in rubbing engagement with brush 46 and continues the circuit on to the other side of the supply through contactor 79, contact 75 and lead 66. The motor rotates under this condition until the insulation insert 45 comes under brush 46. Whenever a specimen 13 ruptures and the relay 38 is deenergized, the timer motor continues to rotate until the disc 42 is in starting position for the next test run. When the relay 38 is energized, the circuit to the timer motor is completed through contactor 63 connected to contact 67 which is in circuit with lead 66 and the supply 10. The timer rotates continuously when relay 38 is energized.

If a D. C. instrument having a slow response characteristic or one embodying a continuous balance potentiometer is used at 25, auxiliary circuit means 68 are employed to reduce the lag in the response of the meter. The output of transformer 52 is put through a full wave rectifier 69. Condenser 70 reduces the pulsations. The D. C. input to the instrument is proportional to the A. C. output of transformer 52. A transformer 71 is employed to add a voltage to the instrument input which is proportional to the rate of rise of voltage across the specimen. As soon as the rise in voltage becomes zero, the effect of transformer 71 is zero. Rheostat 72 controls the degree of extra "push" to be supplied by the transformer 71.

For a short-run test, switch 73 is closed. When switch 73 is closed, relay 43 is directly across supply 12. Relay 39 remains energized for so long as circuit breaker 16 is closed. The clutch remains engaged whereby the voltage across the specimen continues to rise. When the specimen ruptures, circuit breaker 16 opens, relay 39 is deenergized, the circuit to coil 23 is opened and the clutch becomes disengaged, thereby terminating the short-run test.

Other examples of uses to which the teachings set forth above may be applied are in tests and apparatus used therefor, for determining the tensile and compressive strengths of materials.

Obviously many modifications and variations of the present invention are possible in the light of the above teachings. It is therefore to be understood that within the scope of the appended claims the invention may be practiced otherwise than as specifically described.

I claim:

1. A device for producing quick disengagement of a pair of axially aligned cylindrical members having mating surfaces, one of said members being axially movable with respect to the other, each of said members being provided with a beveled edge adjacent the mating surface, the device comprising, a quick acting solenoid having a core with a wedge shaped end, a circuit controlling energization of said solenoid, the core being adapted to assume an extended and retracted position, the axis of the core being perpendicular to the axis of the cylindrical members, the solenoid when energized causing its core to assume the extended position whereby the members are disengaged by wedging action of the core, a spring for returning the core to its retracted position, a switch having an operator located in the path of the movable member so that the switch is operated when the members are disengaged, said switch being in the circuit controlling energization of the solenoid.

2. Apparatus comprising a pair of rotatable, coaxial, cylindrical members axially movable with respect to one another and having interengageable cooperating surfaces, each of the cooperating surfaces of said members being formed with a beveled edge, a solenoid, said solenoid having a core whose axis is perpendicular to the axis of said members, said core having a conical end, said solenoid when energized causing the core to move to extended position and said conical end to be inserted between the beveled edges to forcibly separate said members.

3. Apparatus for controlling engagement and disengagement of a pair of clutch plates comprising electromagnetic operating means for the clutch plates, a first relay and a second relay, said first relay controlling two switches, one of said switches being in the circuit of the electromagnetic operating means and the other of said switches being in the energization circuit of the second relay, the first relay when energized closing said one switch whereby the electromagnetic operating means is energized and opening the other switch whereby the energization circuit of the second relay is kept open, a pair of heavy duty contacts controlled by the second relay, a solenoid in series with said heavy duty contacts and a power source, said solenoid having a core with a wedge shaped end, the solenoid when energized by the closing of the heavy duty contacts adapted to cause the core to assume an extended position whereby the wedge shaped end of the core enters between the clutch plates to positively separate them, whereby deenergization of the first relay causes deenergization of said electromagnetic operating means, and energization of the solenoid to quickly disengage the clutch plates.

References Cited in the file of this patent

FOREIGN PATENTS 201,592     Great Britain _____ July 30, 1923